(12) United States Patent
Salter (10) Patent No.: US 7,799,984 B2
(45) Date of Patent: Sep. 21, 2010

(54) GAME FOR PLAYING AND READING MUSICAL NOTATION

(75) Inventor: Hal Christopher Salter, Seffner, FL (US)

(73) Assignee: Allegro Multimedia, Inc, Boulder, CO (US)

( * ) Notice: Subject to any disclaimer, the term of this patent is extended or adjusted under 35 U.S.C. 154(b) by 1428 days.

(21) Appl. No.: 10/531,642

(22) PCT Filed: May 30, 2003

(86) PCT No.: PCT/US03/17123

§ 371 (c)(1), (2), (4) Date: Apr. 15, 2005

(87) PCT Pub. No.: WO2004/038690

PCT Pub. Date: May 6, 2004

(65) Prior Publication Data

US 2006/0107819 A1    May 25, 2006

(51) Int. Cl.
*G09B 15/00* (2006.01)
*G09B 15/02* (2006.01)
*G10H 1/00* (2006.01)

(52) U.S. Cl. .................. 84/477 R; 84/470 R; 84/483.2; 84/104; 84/600

(58) Field of Classification Search .................. None
See application file for complete search history.

(56) References Cited

U.S. PATENT DOCUMENTS

| | | | |
|---|---|---|---|
| 4,331,062 A | 5/1982 | Rogers | |
| 4,366,741 A | 1/1983 | Titus | |
| 4,416,182 A | 11/1983 | Wise et al. | |
| 4,781,099 A | 11/1988 | Koike | |
| 4,997,374 A | 3/1991 | Simone | |
| 5,107,743 A | 4/1992 | Decker | |
| 5,183,398 A | 2/1993 | Monte et al. | |
| 5,392,682 A | 2/1995 | McCartney-Hoy | |
| 5,627,335 A | 5/1997 | Rigopulos et al. | |
| 5,864,868 A | 1/1999 | Contois | |
| 6,072,113 A | 6/2000 | Tohgi et al. | |
| 6,084,167 A | 7/2000 | Akimoto et al. | |
| 6,204,441 B1 | 3/2001 | Asahi et al. | |
| 6,225,547 B1 | 5/2001 | Toyama et al. | |
| 6,342,665 B1 | 1/2002 | Okita et al. | |
| 6,388,181 B2 | 5/2002 | Moe | |
| 6,555,737 B2 * | 4/2003 | Miyaki et al. | 84/477 R |
| 6,645,067 B1 * | 11/2003 | Okita et al. | 463/7 |
| 2002/0040633 A1 | 4/2002 | Miyaki et al. | |
| 2002/0138523 A1 | 9/2002 | Steinberg et al. | |
| 2002/0144587 A1 * | 10/2002 | Naples et al. | 84/609 |
| 2006/0058101 A1 * | 3/2006 | Rigopulos | 463/35 |
| 2008/0113797 A1 * | 5/2008 | Egozy | 463/35 |
| 2008/0156178 A1 * | 7/2008 | Georges et al. | 84/645 |
| 2008/0311970 A1 * | 12/2008 | Kay et al. | 463/7 |

* cited by examiner

*Primary Examiner*—Marlon T Fletcher
(74) *Attorney, Agent, or Firm*—Webb IP Law Group; Jason P. Webb; Danny Y. H. Cheng (57) ABSTRACT

A video game system comprising a standard drum set having at least one drum set component (30). An electrical pick-up is attached to each component. A game grid (12) is displayed on a display monitor and is electrically resonsive to the electrical pick-up. The game grid being similar to a musical staff with objects, which are moving along the musical staff, that will change appearance when the drum set component is struck at an appropriate moment.

4 Claims, 7 Drawing Sheets

GAME FOR PLAYING AND READING MUSICAL NOTATION

RELATED APPLICATIONS

A related application was: An Interactive Game Providing Instruction In Reading Musical Notation and in Learning an Instrument, application Ser. No. 10/273,353 Filing Date: Oct. 18, 2002, which claims priority to: An Interactive Game Providing Instruction in Reading Musical Notation, Appln. No. 60/347,554, filed: Oct. 20, 2001.

PRIORITY

This application is claiming priority to U.S. provisional application No. 60/384,746, filed on May 30, 2003, entitled: Interactive game providing instruction in playing rhythms and reading musical notation, with inventor Hal C. Salter of Seffner, Fla., U.S.A.

STATEMENT REGARDING COPYRIGHT PROTECTION

A portion of the disclosure of this patent document contains material to which a claim for copyright is made. The copyright owner has no objection to the facsimile reproduction by anyone of the patent document or the patent disclosure, as it appears in the Patent and Trademark Office patent files or records, but reserves all other copyrights whatsoever.

FIELD OF THE INVENTION

The present invention relates generally to an interactive game, and more particularly to an interactive game that instructs a user on both playing rhythms on percussion instruments and in learning to read musical notation while playing the game.

BACKGROUND

MIDI technology has been a stable source of drumming and music sequencing programs for editing, printing, playing and composing music and rhythm for almost twenty years. Some well-meaning music and rhythm tutorial programs, as well as some games, have resulted from this technology. For example, computer aided instruction, including drumpad or drum kit instruction, has been used in the home market for various subjects for several years.

In the area of music and rhythm instruction, the computer has been used, for the most part, to provide a student with an interactive view of musical notation. Other systems have a series of lights or playing illustrations to attempt to communicate to the user which pad should be played next. These programs and systems, while allowing the student to practice and gain feedback, generally fail to involve musical novices sufficiently, especially with regard to rhythm and percussion instruments. Several typing tutorials have enjoyed great success using such methods, but drumpad and rhythm tutorials have not been as successful, due to several key problems inherent with the subject.

A major problem with these prior art learning systems is that they fail to take into account several important differences between learning to type and learning to play music or rhythm. The first most obvious difference is that musical notes cannot merely be played in a correct sequence, but must be played in a rhythmic pattern in relation to the notes before and after it. This correct timing of the correct notes is one of the most difficult aspects to teach in music, by any means, and up to now, few applications have been able to adequately address this challenge, and then only in isolation. The second challenge is that most programs start with musical notation to teach a song or rhythm to the user. Reading and understanding musical notation is a bit like reading Beowolf in the Old English, and it's roots are just as old, in fact the five line staff originally represented a monk's hand in the middle ages, and has been adapted to deal with all the musical innovations since. Then there is the problem of a notational system originally designed to convey pitch for voice, hence the concepts of higher and lower. With rhythmic notation, the pitch axis is used to represent the different rhythmic instruments like cowbell or snare. But on the drumpad, the instrumentation is experienced perpendicularly to the notation, i.e., left to right instead of lower to higher. This difference, while easy conceptually, is a difficult transition to make visually and experientially. Such is the combined difficulty that fewer than 20 percent of all drum players are estimated to be able to read rhythmic notation fluently.

For the novice player, then, there are at least four additional challenges to learning the drumpad compared to learning to type. They must learn the pads to the drumpad, they must learn rhythmic or musical notation, the notation is perpendicular to their drumpad, and they must hit the right pad(s) at the right time. The frustration with these simultaneous challenges usually causes most users to quit, and certainly the task seems more like work than play.

Examples of prior patents in the general area of rhythm instruction are outlined below. Each of these references is incorporated by reference for its supporting teachings.

U.S. Pat. No. 6,342,665, is a drum rhythm game apparatus and a guitar rhythm game apparatus each includes a staging operating unit.

U.S. Pat. No. 6,225,547, is a rhythm game apparatus, rhythm game method, computer-readable storage medium and instrumental device.

U.S. Pat. No. 6,177,623, is a music reproducing system, rhythm analyzing method and storage medium.

U.S. Pat. No. 5,864,868, to Contois, discloses a computer system and method for controlling a media playing device.

U.S. Pat. No. 5,627,335, is an electronic music system has an input device (12), one or more computer storage media, a rhythm generator (100), a pitch selector (108), and a sound generator (102).

U.S. Pat. No. 5,392,682, to McCartney-Hoy, discloses a computerized musical keyboard and a method for using same to play or to learn to play a keyboard.

U.S. Pat. No. 5,183,398, to Monte, et al., discloses an apparatus and method for instruction of a student which includes interactive guidance.

U.S. Pat. No. 5,107,743, to Decker, discloses a keyboard teaching aid having a panel designed to fit over the keys on an existing keyboard so that lights mounted on a panel having more than one color or shape may be located directly above the keyboard keys to be played.

U.S. Pat. No. 4,997,374, to Simone, discloses a teaching device that includes a changeable two channel prerecorded program source, and a console unit including a work booklet.

U.S. Pat. No. 4,781,099, to Koike, discloses a musical quiz apparatus that presents a question chord in sound and a trainee answers by depressing the keys of the chord constituting notes on the keyboard.

U.S. Pat. No. 4,416,182, to Wise, et al. discloses a keyboard teaching device for the self-instruction of a student of keyboard musical instruments is provided.

U.S. Pat. No. 4,366,741 to Titus, discloses an electronic keyboard having a keyboard and an electronic keyboard circuit connected to a micro-processor used to control a CRT device to provide a video note display concurrently with the depression of one or more keys.

U.S. Pat. No. 4,331,062, to Rogers, discloses an apparatus for visually displaying music notes on a note display panel mounted on an electronic keyboard with a support arm.

JP2001096061, is a machine and method of rhythm game, readable recording medium and operation device.

EPO997870A, is a TV monitor (2) outputs various types of images relating to the rhythm game.

Each of these prior art references disclose improvements in the area of interactive musical instruction. However, none of the foregoing instruction aids have adequately addressed the inherent challenges of learning rhythms and rhythmic notation.

SUMMARY OF THE INVENTION

There is, therefore, provided a method of instructing a user to read musical notation through interaction with a graphical user interface (GUI) and an input device, like a drumpad or drum set. In the method a graphical user interface is generated, having a first position. The GUI includes a virtual drumpad or drum set positioned substantially at a top portion of the interface. One or more rhythm files are incorporated into the graphical user interface, wherein the rhythm files contain data corresponding to an arrangement of musical notes in sequence, having a rhythmic pattern. A first game object, representing the first musical note in the arrangement, is directed upward, in a substantially straight trajectory, toward a pad on the virtual drumpad, corresponding to the first musical note. The first game object may travel upwards, or other appropriate direction, until it collides with a bar or other graphic destination representing when to strike the pad on the actual drumpad. This collision represents the precise time in which the note should be played according to the rhythmic pattern of the musical arrangement.

A second game purpose or objective, representing the second musical note in the arrangement, is then directed upward (or other direction as appropriate), in a substantially straight trajectory, toward a destination, like a bar, representing the second pad on the virtual drum set, corresponding to the second musical note, such that the second game object, or image, will experience a second collision with the second virtual drumpad, according to the rhythmic pattern of the arrangement. A point value may be awarded based upon the user striking the corresponding real drumpad on the input drumpad approximately simultaneously with the collisions on the GUI screen.

There may be a rhythmic tolerance, or 'hit window' or pane, where points can be scored by hitting the appropriate drumpad when the object enters the hit window or collides with the virtual drum pad destination. The hit window is or pane is intended to be controlled by the user to expanded or contracted the size thereof, allowing players of various levels of skill to achieve relative success playing the game.

In one embodiment, once a predetermined threshold of user performance has been met, the interface is rotated gradually to a second, third and fourth etc., positions, counterclockwise until achieving approximately ninety (90) degrees, such that the virtual drumpad is positioned substantially on a left side of the interface and the objects arrive from the right. The first and second game objects (images) continue as before to move along the first and second substantially straight trajectories, toward the virtual drumpad. However, in this final position, this trajectory is right to left, rather than down to up, as in the first position of the game field.

A series of visible musical staff lines defining spaces may then be introduced upon achieving a horizontal game movement position. These lines and spaces correspond to the trajectories along which the game objects (images) travel toward the virtual drumpad. Thus, the game objects travel along either the lines or the spaces, until colliding with the virtual drumpad at the corresponding pad. Thus, representing actual notes on a musical staff to be played by the various drum set parts in the desired rhythms. The music staff lines may be introduced any time in the game, but it has been found to work better when introduced upon achieving a horizontal game movement position.

In one embodiment, the game objects may be gradually morphed into classical musical or customized rhythmic notation upon proper execution of the instrument with the game.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

It is noted that the drawings of the illustrated embodiments are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. Wherein the drawings are as follows.

DETAILED DESCRIPTION OF THE PREFERRED EMBODIMENT(S)

The presently preferred embodiments of the invention will be best understood by reference to the drawings, wherein like parts are designated with like numerals throughout.

Overview

The present invention is based, at least in part, on an organizing principle used for years as the underlying logic of old player pianos and music boxes, where pitch and time are converted to an x-y grid, and run past a mechanism that plays the appropriate pitch or instrument at the appropriate time. A similar screen view and representation is also common in MIDI sequencing programs.

The present invention provides an interactive game that allows a more logical transition to learning musical notation. Specifically, the present invention involves a process for interpreting MIDI files into a computer video game, which can be generated with software for a personal computer or with hardware component that interfaces directly with a TV and MIDI drumpad, or is integrated with the digital drum machine as a feature of the device. MIDI files storing musical notation and other information are used to generate unique game fields and objects whereby; game objects 16 (images) stream upward toward a virtual drumpad 14 or graphic representing it. The game objects 16 gradually convert to moving musical notation (a musical staff turned 90 degrees clockwise to put pitch or instrument axis parallel with drumpad) (see 16 at FIG. 2). In this way, the target virtual drumpad and streaming graphic game objects (representing musical notes) are parallel to the player's input MIDI drumpad, allowing easy correlation with striking a correct drum pad.

As the game progresses and the skill of the user increases, the game interface 10 later rotates counter-clockwise 90 degrees and the objects eventually morph into moving classical musical notation. Game objects 16 may be spaced proportionate to the melodic, harmonic and especially rhythmic structure to facilitate interpretation of relative rhythmic timing in game play. Game objects may move toward the virtual drumpad 14 in tempo of music, allowing visual and audio anticipation and precise rhythmic play by a user. The virtual drumpad graphic 14, the game objects 16 and the actual MIDI drum set pads can be color coordinated to facilitate correlation of a correct note with correct drum set pad. The game may also keep track of hits and misses, generating a score and a musical map for review. It is also contemplated to have the game objects numbered for standard hand sequencing clues.

Figure 1:
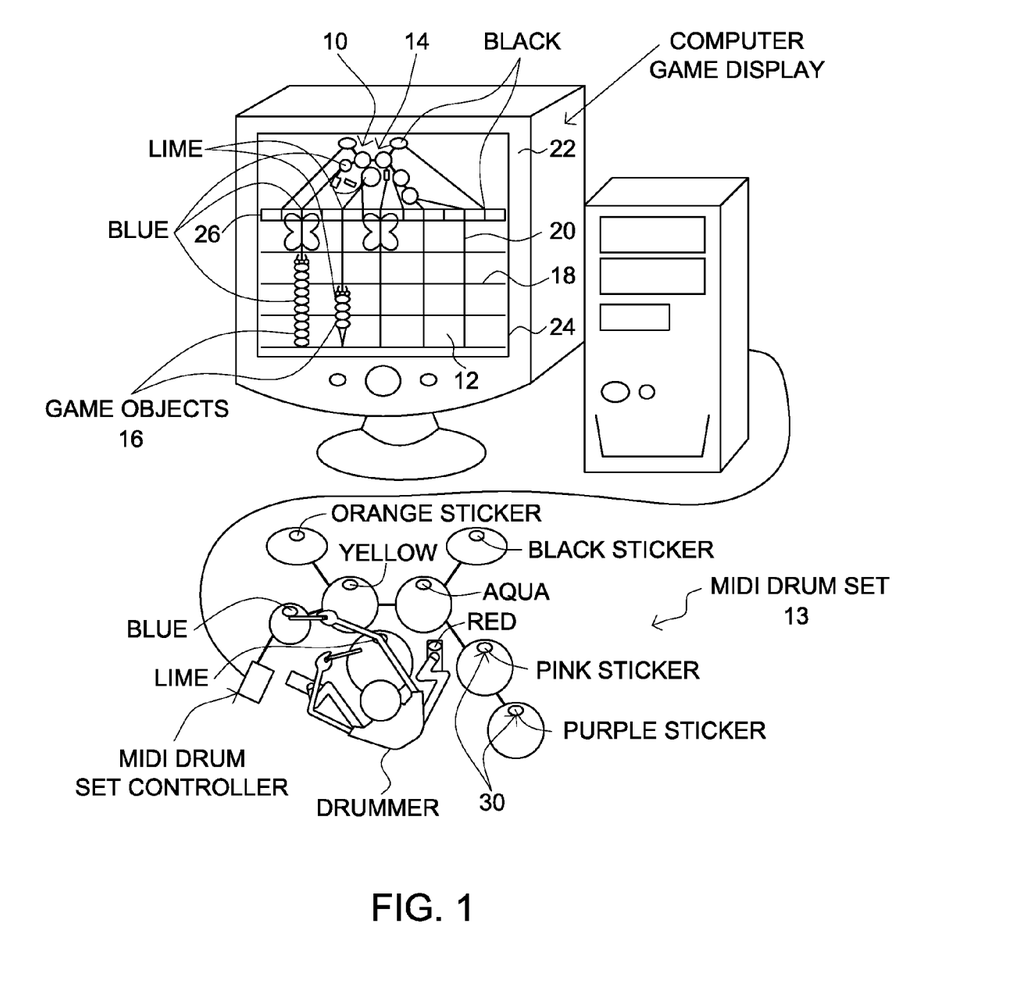
FIG. 1 shows an embodiment of graphical user interface (GUI) at first position, according to the present invention (caterpillars/butterflies).

Referring to FIG. 1, a graphical user interface (GUI) 10 is shown according to the present invention. In the game, there are several possible views of the interface 10. The default could be a straight overview of the rectangular grid-based playing field 12, with the virtual drumpad 14 at the top of the screen, or interface 10, and the game objects, or optional notes 16, moving upward.

The underlying GUI logic is that the objects 16 are moving upward along an invisible graph-paper like grid with the horizontal y-axis 18 representing the pitch or instrument (left=lower pitch/instrument, right=higher pitch/instrument) and the vertical y-axis 20 representing time (up=beginning of piece, down=end of piece) as subdivided by eighth notes or triplets or sixteenths, whichever is musically appropriate.

Along the top 22 of the screen or interface 10, or perhaps ¾s of the way up from the bottom 24, with space above and below, there is illustrated a virtual drum set 14, showing where drumpads are stretched horizontally across the screen to a grid of panes (or target zone) 26 as illustrated by the stretch lines 27. This allows the moving objects to approach the grid (or hit window) 26 and indicate which drumpad to strike on the virtual drum set 14. The grid pane 26, is positioned horizontal and parallel to the x-axis 18. Each section of the grid of panes correspond exactly to each virtual drumpad 28 from the virtual drum set 14.

It is noted that the GUI 10 of the present invention is a thus a unique variation on the piano roll interface seen on some MIDI sequencer devices, which is in turn a variation on player piano rolls and music box construction.

Some differences between the present interface 10 and current drumpad roll interfaces are as follows. First, the interface 10 of the present invention is turned clockwise 90 degrees, thus reading and moving from bottom 24 to top 22 instead of left to right to facilitate intuitive hand eye coordination, resulting in a moving interactive drumpad or drum kit tablature.

The present invention provides an interactive game that allows a more logical transition to learning musical and rhythmic notation. Specifically, the game simplifies musical notation into a grid of x and y, but with pitch or instrument moving from left (lower notes) to right (higher notes), parallel with the drumpad layout, and the dimension of time moving up from down (the bottom of the screen being the end of the piece). Thus the game is played with two "drum sets", one target virtual drum set 14 on the GUI, the other, an input drumpad 13. For example, an external matching MIDI drumpad (not shown) that plugs into a game port or USB outlet or RCA video input, and is positioned in front of a TV or monitor, could be used with the present invention.

At the beginning stages of the game, the virtual drum set 14 is on the top 22 of the screen 10. The notation is transformed and turned ninety (90) degrees clockwise, and disguised as spaced graphic game objects 16 moving upwards in a parallel stream toward the virtual drum set 14. By turning the underlying musical grid of pitch or rhythmic instrument, and time, clockwise 90 degrees, the target virtual drumpad is also parallel with the users electronic input drum set 13.

In the beginning phases of the game, the player will see blocks or objects 16 rising from the bottom 24 of the screen 10 toward the virtual drumpad 14, and their vertical and horizontal relationships to each other shall be a representation of relative musical time and appropriate instrument or sound. As these objects approach the virtual drumpad 14, the corresponding drum set pad along that path will be visually obvious, and the object of the player is to hit the corresponding pad on an MIDI compatible peripheral drum set 13 (or input drumpad) at precisely the time the object 16 touches the virtual drumpad 28 on the virtual drum set 14. This is also illustrated by having the object 16 touch the bar 26 (pane). The game objects 16, the target virtual drumpad 14 and the input drumpad 13 (e.g. MIDI Drumpad) can be color-coded, with color stickers 30 placed thereon or having the manufacturer make the whole drumpad that color from the start. Thus, this game design combines the following graphic and feedback elements to create a completely new, efficient and fun means of teaching a user to play the drumpad and to read musical notation.

The game objects 16 are spaced proportionally to the rhythm and pitch or instrument of the song to facilitate interpretation of relative timing in game play. The game objects 16 move smoothly toward the virtual drumpad 14 or graphic in tempo with the music, allowing visual and audio anticipation of the correct rhythmic timing to enable precise game play.

It is noted that the dimension of time, carrying rhythmic information, flows graphically UPWARD, toward the virtual drumpad 14 or graphic representing it positioned toward the top 22 of the screen or monitor. This upward flow of game objects 16 relative to the virtual drumpad 14 allows the game to gradually return to classical musical notation or customized rhythmic notation without losing coherency for the user.

It is also noted that the game objects 16, virtual drumpad 14 and MIDI input drum pad pads can be color coded to facilitate easy correlation with correct pad. The interactive game can provide instant visual and/or audio feedback to let players know how they are doing. The game can also keep a detailed tally of score, hits and misses, providing a map of the game field for later review.

Figure 2:
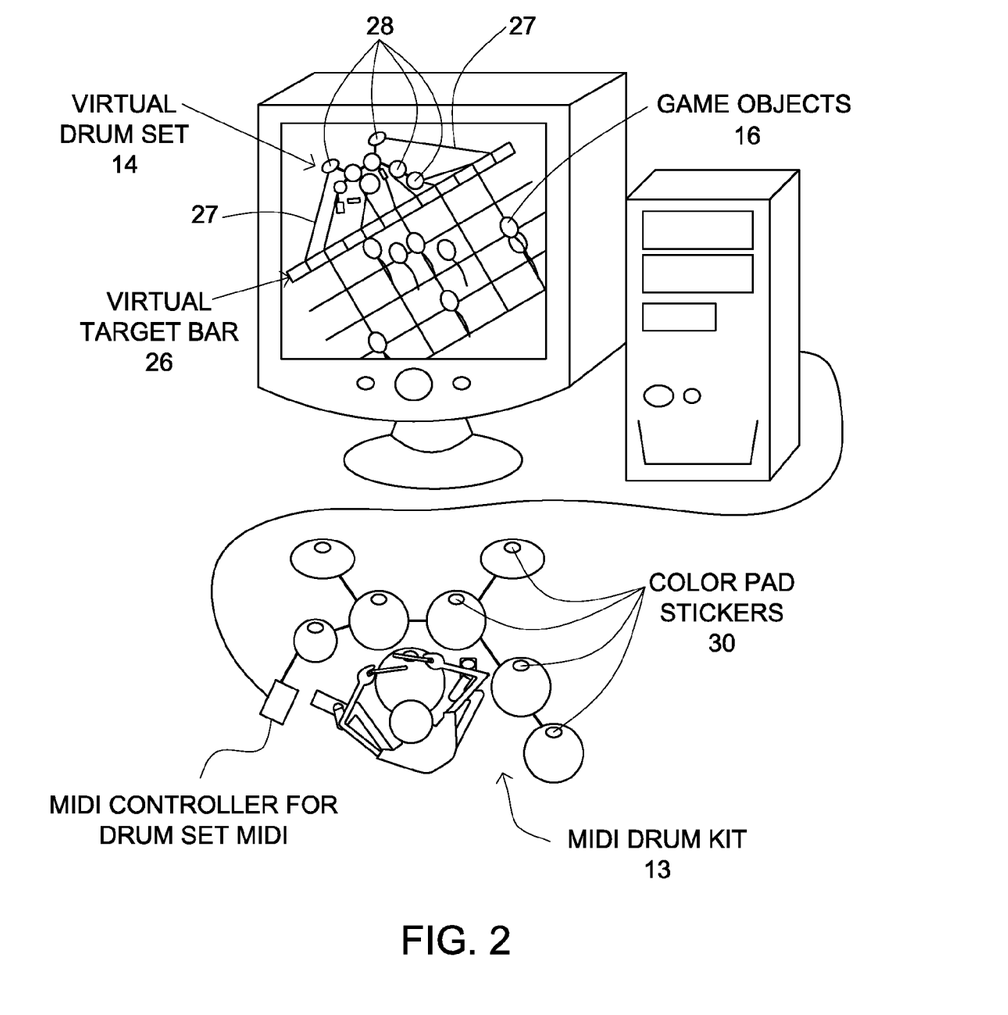
FIG. 2 shows the GUI of FIG. 1 as it was rotated into a second position (balloons popping).

In FIG. 2, is shown the gradual counter-clockwise rotation (shown at 30) of the interface 10. This rotation can occur at later stages and levels of the game. Thus, as play progresses, the playing field gradually converts to traditional musical or a customized rhythmic notation. As the playing filed 12 converts to traditional musical notation, the underlying musical map of musical notation becomes apparent.

Figure 3:
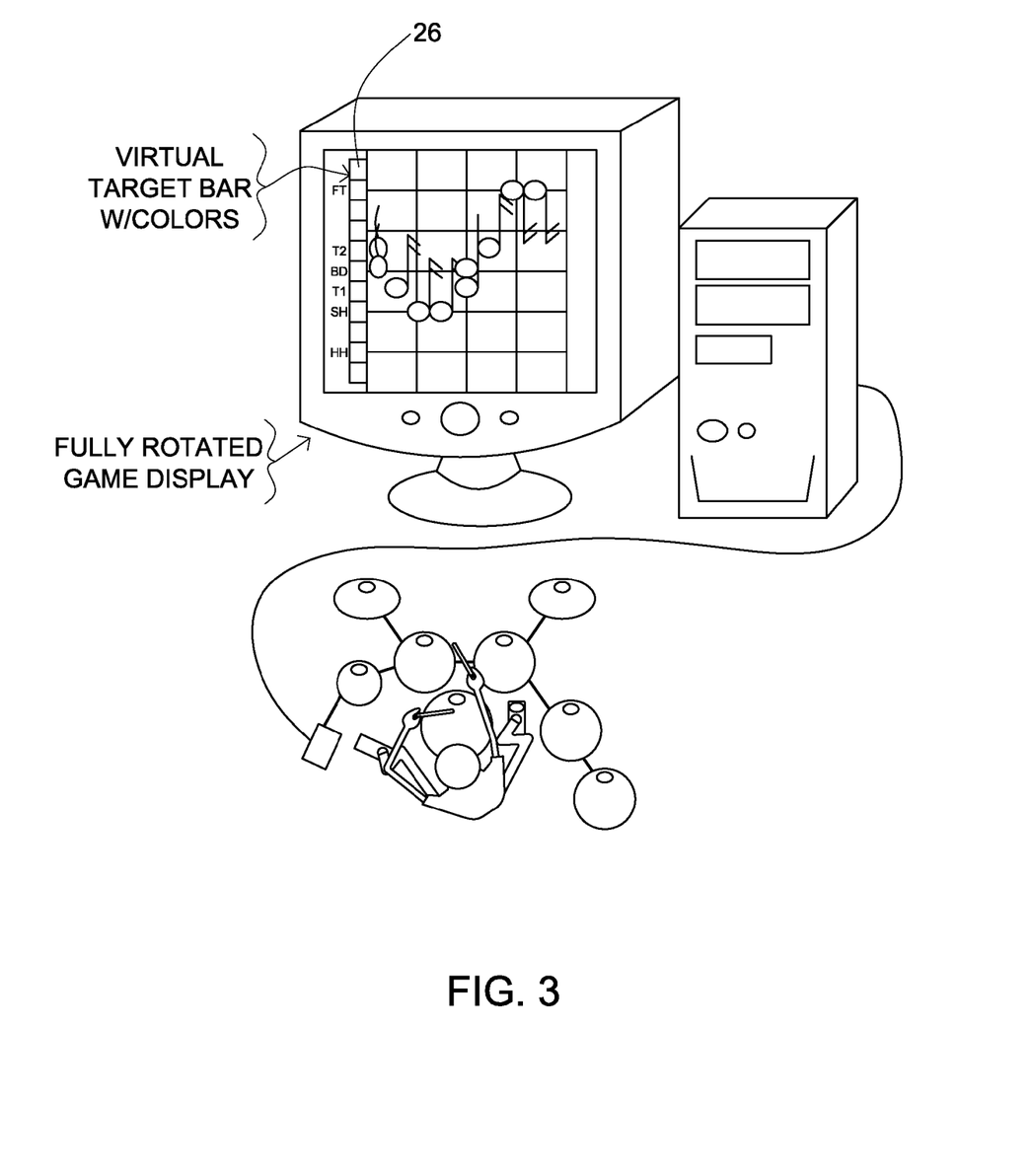
FIG. 3 shows the GUI of FIG. 1 as it was rotated into the final position, and now incorporates notes on a music staff.
Figure 4:
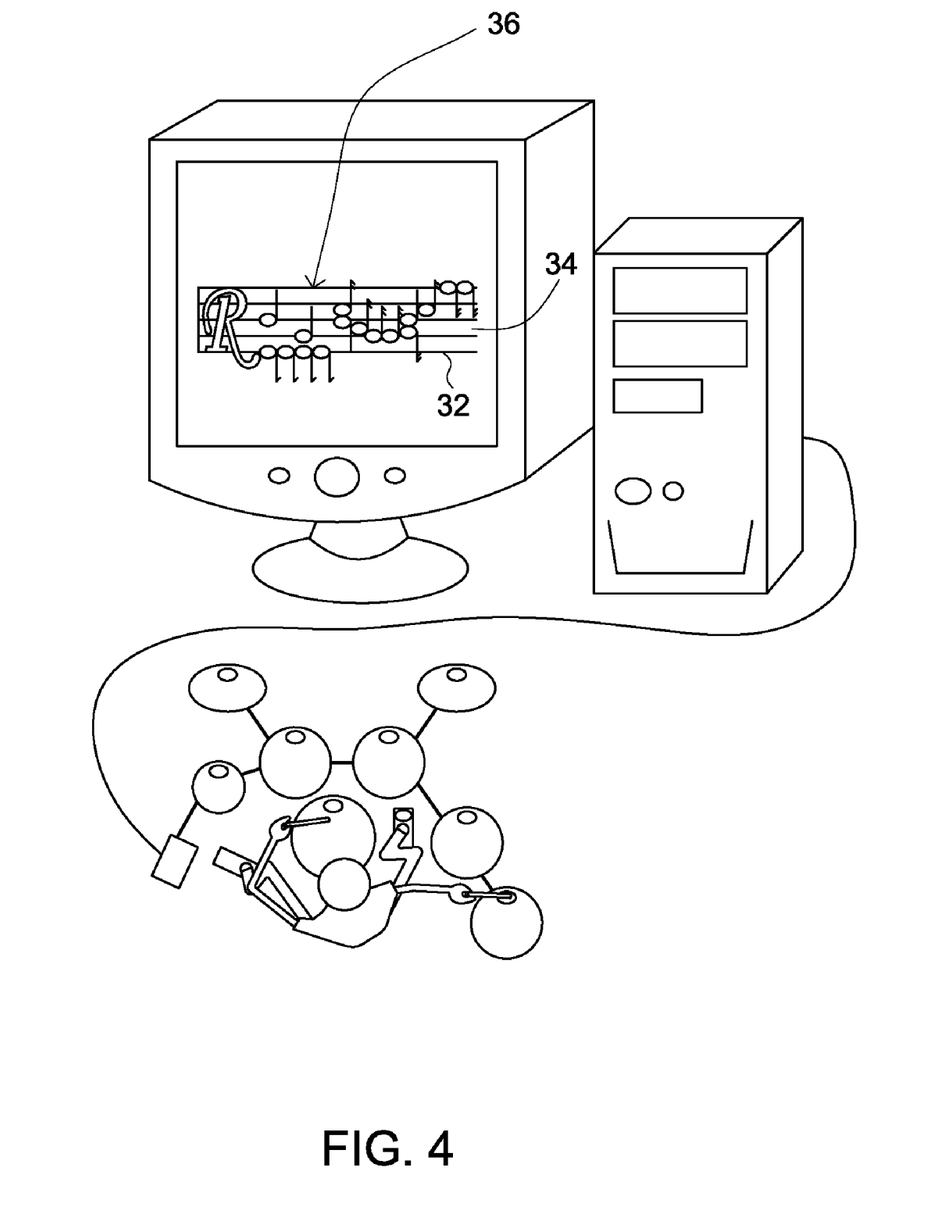
FIG. 4 shows one transformation of the game object trajectories into staff lines and spaces.

In FIGS. 3 and 4, it is seen that the interface or screen 10 transforms from a grid to a musical staff 36. The trajectories along the grid panes 26 transform into staff lines 32 and corresponding spaces 34. In this manner, the interface 10 eventually assumes the traditional left to right reading view of standard musical notation. It is noted that at this stage of the game, the game objects or notes 16 can still be colored and the virtual target drum set 14 still in view. However, as is apparent from FIG. 3, the drumpad 14 orientation is now vertical, having standard abbreviations for the various drum set pieces, such as: FT-foot, BD-base drum, SN-snare, etc.

In FIG. 4, the notes 16 and the view are going from colored to black, but they are still moving toward where the virtual drum set 14 has been, and gradually the other elements of traditional musical notation enter the game. This is the later, highest levels of the game. By now, the player can play the song almost perfectly, and at these levels, is conditioning himself to recognize the underlying logic of musical and rhythmic notation.

Figure 5:
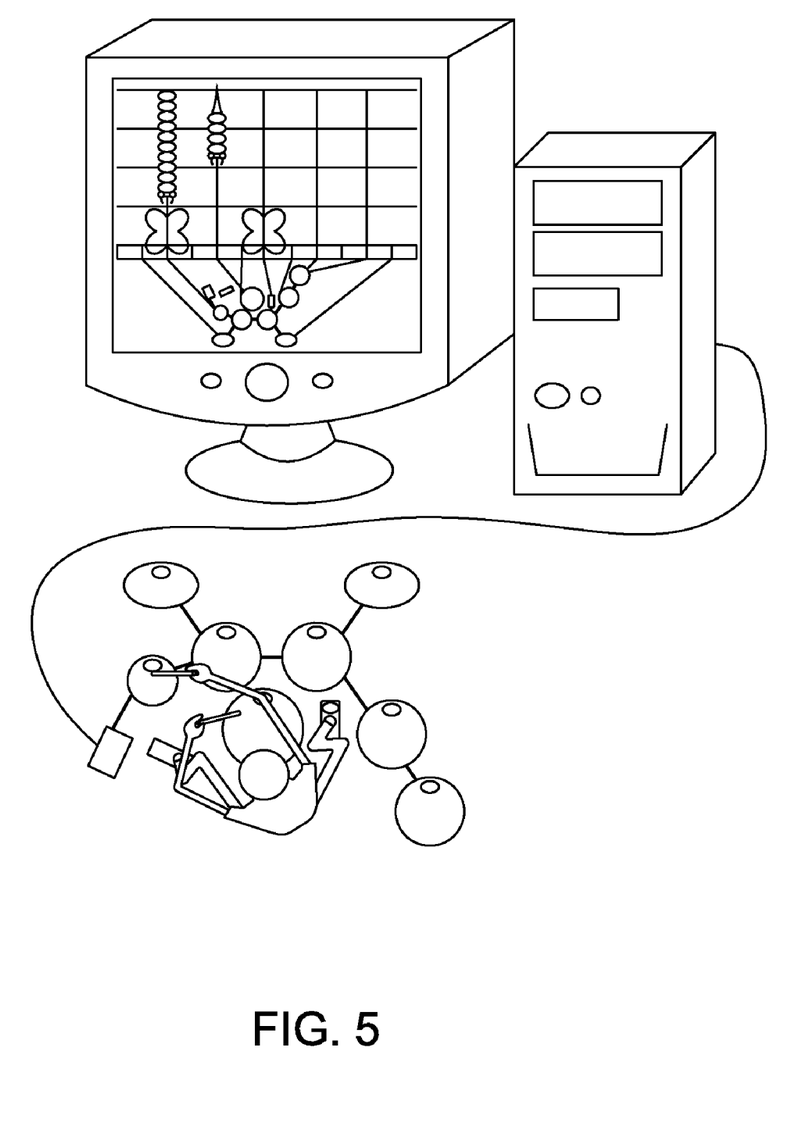
FIG. 5 shows a variation in the starting layout of the GUI (up to down motion).

In FIG. 5, a variation in the starting layout is shown. In this embodiment, the player's view can start with a vertical musical staff (rather than horizontal) as the player wishes. In fact the vertical staff coupled with moving notes is a new form of musical notation, and drumpad tablature.

Figure 6:
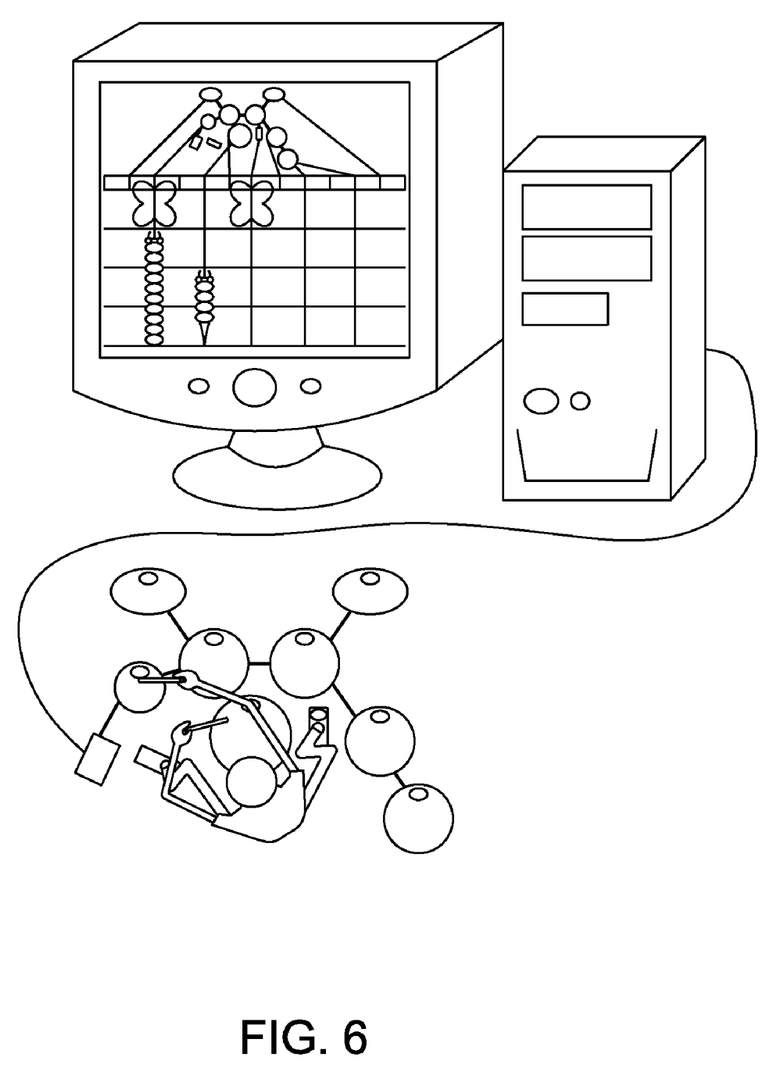
FIG. 6 shows another embodiment of the present invention utilizing variations in the game objects (caterpillars/butterflies).

In FIG. 6, an embodiment is shown wherein the game objects are caterpillars turning into butterflies.

Figure 7:
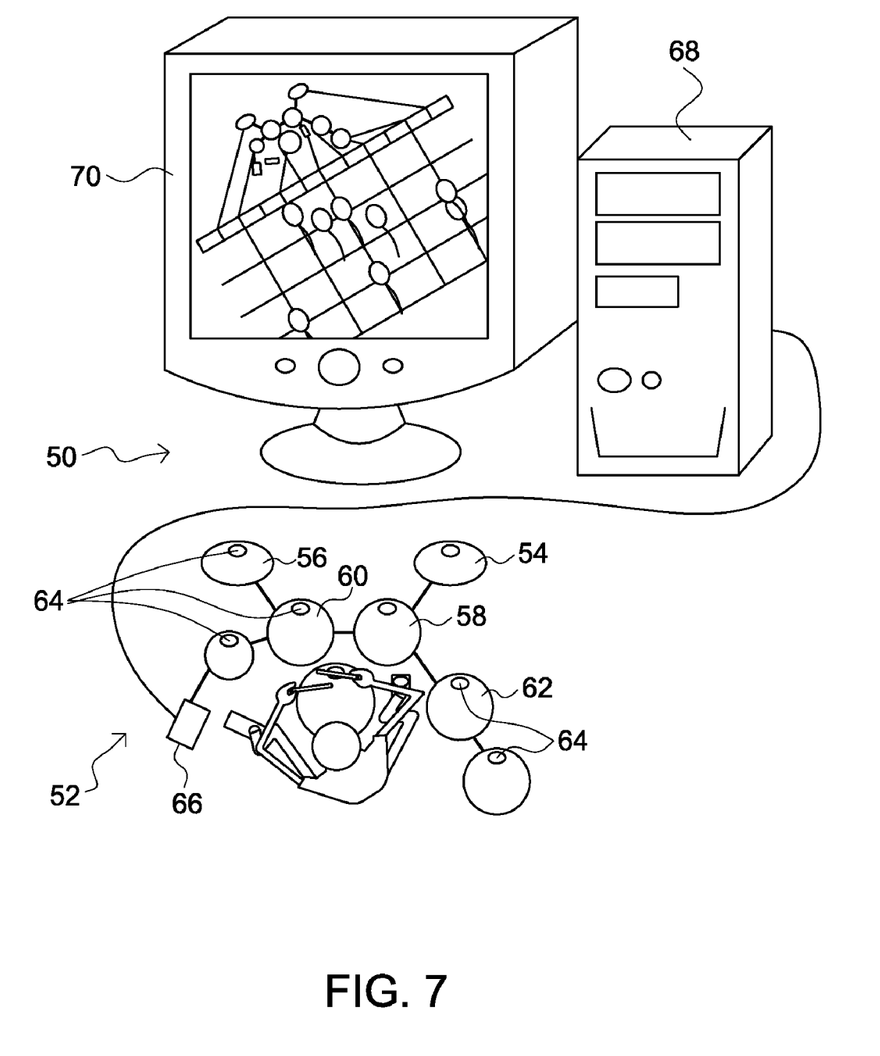
FIG. 7 shows yet another embodiment wherein utilizing variations in the game objects (balloons popping).

FIG. 7 similarly shows a variation of the game objects. In this embodiment, the game objects are popping balloons. These are mere examples of the endless possible graphic objects that could be used to represent musical objects in the game. FIG. 7 also illustrates a new variation of the present invention 50. For example, there is a standard drum set 52, having non-MIDI drum set components, like cymbals 54 and 56, and drums 58, 60 and 62. On each of the non-MIDI drum set components is an electrical transducer, or electrical pick-up device 64, which has the purpose of identifying when the drum set component has been struck, how hard it was struck, the duration of the striking, and other common features needing to be recorded. The transducer 64 will convert the physical characteristics of the drum set component and convert it to representative electrical signals. The representative electrical signals are routed, via electrical wires or other means, like IR (infra red) or radio, to an electrical controller 66, which has the purpose of processing all of the received representative electrical signals, processing those signals, and relaying those resultant signals to a computer, software computation device or processor 68. The computer then illustrates the interaction on the monitoring device 70. It is noted that this embodiment allows standard drum sets to be retrofit with this electrical feedback system 50 to enable easy teaching of the drum set, without having to purchase a new electronic MIDI compatible drum simulator.

It is noted that the game of the present invention can be slowed down and simplified to allow any level user to play. Moreover, in one embodiment, the user can number the game objects 16 to remind him of best hand to use during the game. The player can also choose different views and graphic themes to facilitate game play or provide variety. The player can also control the tempo, the complexity of play, the types of feedback and scoring options.

It is noted that the game is suitable for any modem console or computer system that supports MIDI or other music file systems. The player's main task in the present invention will be to hit as of the many moving objects as possible, by hitting the corresponding drumpad pad for that object at the right time, repeating the level until they have reached a certain percentage and move up to the next level of complexity or faster tempo, and in doing so, subconsciously learn to play a song, and in the later levels, to recognize and read sheet music.

II. Game Mechanics; Overview

The present invention is a moving target, hand-eye coordination game in the tradition of Tetris or Asteroids. The present invention is different, how ever, in that the game play focuses less on a pre-designed puzzle or randomness, but instead on the player trying to hit catch the game objects by timing his strike of the drumpad pad with the timing of the note object striking the virtual drumpad, or the graphic representing it.

In fact the whole point of the game is to reveal the hidden map and grid like characteristics of traditional notation, and to condition the hand eye coordination necessary to successfully interpret this notation on sight. The game graphics will be numerous variations to vary and camouflage the essential grid-like interface and underlying musical notational logic, which will be absorbed unconsciously.

Game GUI and Camera View

The majority of the player's screen will be taken up by a view of the game-world. A few other elements will be over laid on top of this view in order to provide the player with information about status and goings on in the game-world.

In the game, there are several possible views of the interface 10. The default should be a straight overview of the rectangular grid-based playing field, with the virtual drumpad at the top of the screen, and the game objects, (notes) moving upward.

At later stages and levels of the game, the screen gradually begins to rotate counter-clockwise 90 degrees to the left, gradually converting to traditional musical notation, and then rotate back to the traditional left to right reading view of standard musical notation as the screen transforms from a grid to a musical staff.

Another possible view is the same as the first but with perspective view, wider at the bottom, narrowing at the top. This view can be exaggerated so that the 'target virtual drumpad pads' appear to be in front of the player, with the note objects appearing to come from the player, moving away toward the target pads. Several graphic variations will include a space 'behind' or on top of the virtual drumpad to act out graphic feedback when the player hits the right or wrong note. The player's view can also start with the musical staff, horizontal or vertical as the player wishes.

Replaying and Saving

The player has no "death" in the present invention; they merely compete against the action for points, musical pleasure and a possible perfect score. The songs are divided up into sections, sometimes divided at musical junctures, sometimes by arbitrary numbers of measures, the player decides which before the game. The player is able to go back to the last check point and play that section again as many times as he wants until he passes it with an acceptable percentage or score. Check points are scattered through out the levels, and the game automatically and transparently remembers when the player has reached such a checkpoint. The checkpoints will be carefully placed so as to enhance the challenge of the game without making it frustrating for the player.

During the game play, the player will be able to save at any time. However, when the saved game is restored, it will only start the player back at the beginning of whatever level the game was saved on, instead of at the exact location (or check-point) the player was at on that particular level. This encourages players to finish a given level before they stop playing the game.

Controls Summary

The player will use a MIDI compatible electronic drumpad to play the present invention and a mouse or the MIDI drumpad to select the song and adjust the game settings. Once the game is in play there is no adjustment of the settings unless they pause, at which time they can change any game settings, go back to another part of the game, or quit.

Song Selection

Players are able to select which song or musical piece or rhythm is to be used as the engine and map of the game, via standard tree structure and file selection means in Windows. There will be a default folder for players to choose files from when they first begin the game.

Track Selection

Certain MIDI files and songs are already broken up into 'tracks' or the equivalent of voice, or orchestral parts, or simply the treble and bass clefs. Players are able to select which tracks or combination of tracks are to be included in the game, again this will affect the score as to what percentage of the total song these tracks include. The selection of songs, then number or choice of tracks, and then tempo are the principle ways that the player can determine the level of the game, and the focus of the repetition.

Selecting the Tempo

When the player presses and holds the + or − button, the player will see a numeric display of the tempo in quarter note beats per minute. The player can then increase or decrease the tempo as desired. The score will be a multiple of tempo, tracks and percentage right.

Time Signature

The MIDI file in question will contain this information, ¾, ⅔, etc., and this information will be displayed for reference, since the notes hit on the primary and second beats of the measure will be worth more, and they will be identifiable either by accompanying measure lines or differentiated size of shape of the notes on those beats.

Current Notes Correct Count

In the corner will be displayed a numeric representation of the current score, in both percentages and absolute numbers.

Rhythmic Precision Tolerance

Since the computer measures time in nanoseconds, there must be a time tolerance within which the human player can hit the correct pad and still get credit. This tolerance can be expressed on the screen in length along the time line, and set at the beginning of a song, or varied as a movable graphical line that condenses or enlarges the 'hit' area or window.

Color Selection

Players are able to select whether the game objects and drumpad pads to be used are in color or in the traditional black and white drumpad configuration.

Feedback Selection

Players are able to select what feedback the game gives them, visual or audio or both, positive sounds, negative sounds or silent, or simply a scoreboard total at the end, with the song in question being played as a reward and a surprise. They can also get a scrolling exact scorecard after the game to see where they missed and to rerun difficult passages. The song can be played as a test run if the players want to see the terrain before playing.

General Movement

The game objects move toward the virtual drumpad that may be disguised as some other graphic representing the pitch or instrument target for the game objects. The game can be configured so the game objects move up, down, left or right, but the default setting will be that the game objects move up, and then once a certain level of proficiency is reached, (determined by score) the game direction moves counterclockwise gradually until the game objects are moving toward the left. This is the first phase of a gradual graphic transition into traditional musical notation and the musical staff as background.

Variable Speed Movement

The player can pause and adjust the tempo and other settings of the game.

Graphic Themes

Graphic themes can be overlaid like skins over the grid-like infrastructure of the game. Different backgrounds, game objects, targets and event feedback, can be used. Here are some sample interfaces that might be used.

For example,

A. The arriving notes could be depicted as caterpillars (16 in FIG. 6) that are transformed into singing butterflies 16(b) if the proper drumpad pad is struck at the right time.

B. The arriving notes could be balloons or some other object that pops (40 in FIG. 7); if you hit it just right. (This version should transform into musical notes floating up the staff, and eventually rotating to a horizontal game, completing the illustration of the underlying musical map. This could be a multi-colored version with a rainbow drumpad and corresponding colored balloons in the game will allow people with no notion of white and black key patterns to successfully identify the right keys and play.)

C. The arriving notes could be meteors that need to be defended against with a force field.

D. The arriving notes could be soccer balls that are moving toward goals and goal keepers who must kick the balls in or away at the right moment.

E. The arriving notes could be trains that need to be switched to the right track at the right moment.

F. The target could be trapdoors and only by pressing the pad at the right time does it open so you can catch the game objects.

G. The target could be mouths and only by pressing the pad at the right time does it open so you can eat the game objects.

These are just some of the many possible variations, but the central underlying grid that rotates and transforms into a musical staff is the organizing principal of the game.

Source MIDI Files for the Game

The game will include some basic MIDI files, such as scales, arpeggios, chords, elementary and popular songs. It will also have a hyperlink to AllegroMultimedia.com where a resource page will point them to the vast resources for MIDI files on the web. Complex Latin, Caribbean and African rhythms can also be learned using the MIDI drumpad as a drum set. In fact one of the primary advantages of learning through this system is that the drumpad player will now have the advantage of visual anticipation of the coming beat; which is common in ensemble drumming or guitar playing, but not when reading notation.

Reading

Basic tutorials on musical notation and theory will be included for player reference, worded as 'tips' for navigating the minefield of musical notation.

Collaborative Play

Players will be able to team up and play together, with a virtual line separating the MIDI tracks and the player's respective parts. Later versions will allow multiple drumpads to interact on the same complex musical piece.

Signs

Players will have visual cues as to measure, time signatures, key signatures, section beginnings and endings.

Levels

Levels will be determined by tempo, number of tracks, rhythmic and harmonic complexity. The game will provide an approximate algorithm to grade the degree of difficulty. Songs from different drumpad tutorial systems will be used to give a kind of graduated sequence of difficulty to the users.

Fingering

Left or right hand information will be included in some special tutorial game levels, but most MIDI files do not include left or right suggestions. However, the game objects can be numbered by the user for reference during the game, much like students write notes to themselves regarding the use of the left or right hand on regular sheet music as a memory tip or suggestion. A left or right software algorithm can be calculated in subsequent versions of this invention.

Providing Advice

The game can provide flashing warnings for the next game object coming up or that a particularly dense or difficult passage is coming, and can give verbal color warnings and verbal and visual encouragement to the player during the game. Strategy tips can be perused before beginning any game.

Game Elements

Fog: a thick, black or gray cloud can enter the game to obscure certain parts of the field of play in later levels of the game to test memory and pattern retention abilities. This fog cloud will hang in the air for some time and the player will have to be careful not to lose the beat in that cloud until it dissipates.

Blackout: for a few seconds at random moments the screen could black out to encourage looking ahead, memorizing and getting an internal time clock.

Since this game will function using the MIDI format, virtually any song, musical piece or rhythm can be incorporated, making it universally accessible and useful. The game should be written in a language like C++ that allows cross platform performance, such as Windows®, Mac®, Nintendo®, Playstation® or stand-alone devices attached to a drumpad or even a TV Summary of Description of Drumpad Teaching Software Game A process for interpreting MIDI files into a computer video game, which can be generated with software for a personal computer or with hardware component that interfaces directly with a TV and MIDI drumpad. MIDI files storing musical notation and other information are used to generate unique game fields and objects whereby, game objects stream upward toward a virtual drumpad or graphic representing it, then morph into moving musical notation (musical staff turned 90 degrees clockwise to put pitch or instrument axis parallel with drumpad) Target virtual drumpad and streaming graphic game objects (representing musical notes) are thus parallel to the player's MIDI drumpad, allowing easy correlation with correct pad. Game interface later rotates counterclockwise 90 degrees and morphs into moving classical musical notation or a customized rhythmic notation, Game objects are spaced proportionate to the melodic, instrumental, harmonic and especially rhythmic structure to facilitate interpretation of relative rhythmic timing in game play, Game objects move toward virtual drumpad in tempo of music, allowing visual and audio anticipation and precise rhythmic play by user. Virtual drumpad graphic, the game objects and the MIDI drumpad pads can be color coordinated and symbol coordinated to facilitate correlation of correct note with correct drumpad pad, Game keeps track of hits and misses, generating a score and a musical map for review, and allows game objects to be numbered for left or right hand clues.

VARIATIONS OF THE PREFERRED EMBODIMENT(S)

It is noted that in a skilled artisan would understand that there are many potential variations available to many of the features of the illustrated embodiments that will be clear to one skilled in the art after becoming familiar with the above description. For example, most any rhythmic piece from a rhythmic instrument or percussion instrument is intended to utilize the illustrated embodiments.

Although the above embodiment describes being applied to any percussion instrument, a skilled artisan will realize, after reviewing the description, that most any instrument may be implemented, including any wind (i.e., oboe or trumpet), electrical (i.e., guitar), or string (i.e., violin) instrument. In fact, it is even contemplated to incorporate several instruments into the same interactive program. In this way, a small quartet, for example, may practice playing a musical piece together while enjoying the. fun of a computerized game. Obviously, this will hold true for any number of band or orchestra players all learning to play together in a fun environment. This variation of multiple players, especially wind and string instrument players, will require different sensors to first receive musical input from the player and then translate the audio into digital or electrical signals for the computer to determine if the timing and tone of the notes played are correct to determine points earned in the game. However, there are many available sound pickup devices or transducers that may be implemented with the computer system.

Even though the illustrated embodiment discusses the use of a game environment for learning a musical instrument, a skilled artisan will understand that most any computer environment will suffice. The main feature of the environment is to make it interesting to the player of the instrument. The use of the word "game" is meant to be used in the broadest meaning, and includes any type of interface where a user controls inputs and the computer interface illustrates a response when execution of the input is performed. A game interface is just a certain type of GUI (graphical user interface). Thus, the environment is not being limited to purely game type environments.

Additionally, it is contemplated to use any type of visual feedback on the display upon proper execution of the musical instrument(s) instead of, or in conjunction with, caterpillars and butterflies. For example, a tree may be exhibited on the display that grows in response to proper instrument execution. Also, a picture may gradually be revealed upon proper execution. A path may be traversed to reveal new locations upon proper execution, much like a character in a game that is exploring new places in a fantasy world. Pieces may be moved on a game board in response to the musical instrument being played. Points may be accumulated or subtracted in response to the playing. Any type of game or other visual display information may be displayed and manipulated by receiving input from the associated musical instrument.

Although the current embodiments discuss the use of positive responses (i.e. change caterpillar to a butterfly) from proper execution of the musical instrument, other responses are also contemplated for all musical instrument execution (proper or improper). For example, improper execution of the musical instrument may cause a change to the GUI or game, like moving a player piece backwards on a game board, or dissolving a picture, or taking away points accumulated. The possibilities are endless to one skilled in the art of psychology or games.

The current embodiments have discussed the use of a visual display being somewhat controlled by the playing of a musical instrument. However, any number of responses may be provided by the present invention. For example, corresponding sounds may be generated in response to execution of the instrument, harmonic sounds when done properly and discords in response to improper execution of the instrument. Additionally, any type of "controlled device" is contemplated besides a visual display. For example, a sound generator, a toy electric car, a model rail road train, a mobile that rotates with objects attached thereto, an electric fan, or any electrically controlled or actuated device.

Physically attachment of electrical pick-ups or transducers have been discussed in the current embodiments. However, one skilled in the art will know that a transducer does not have to be in physical contact with many instruments in order to generate appropriate electrical signals. Additionally, although a hard wire connection is illustrated between the instrument and the processor or computer, any electrical connection is contemplated. For example, IR (infra red) or radio are known alternatives to hard wired electrical connection.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of instructing a user to read musical notation through interaction with a graphical user interface and an input device coupled to a drumpad, comprising the steps of:
    a) generating the graphical user interface, having a first position, including a virtual drum set, having a plurality of pads, each pad having a corresponding pad on the input drumpad;
    b) incorporating a music file into the graphical user interface, wherein the music file contains data corresponding to an arrangement of at least a first and a second musical note in sequence, having a rhythmic pattern;
    c) directing a first game object, representing the first musical note in the arrangement, upward, in a first substantially straight trajectory, toward a first pad on the virtual drumpad, corresponding to the first musical note, such that the first game object will experience a first collision with the first pad;
    d) directing a second game object, representing the second musical note in the arrangement, upward, in a second substantially straight trajectory, toward a second pad on the virtual drumpad, corresponding to the second musical note, such that the second game object will experience a second collision with the second bar or pad, according to the rhythmic pattern of the arrangement;
    e) awarding a value to the user based upon the user striking the corresponding key on the input drumpad approximately simultaneously with the first and second collisions;
    f) rotating the interface to a final position, approximately ninety (90) degrees counterclockwise, once a predetermined threshold of user performance has been met, such that the virtual drumpad is positioned substantially on a left side of the interface, and the first and second game objects move along the first and second substantially straight trajectories toward the virtual drumpad; and
    g) introducing a series of visible staff lines defining spaces, where the lines and spaces correspond to the straight trajectories along which the game objects travel toward the virtual drumpad, such that the game objects travel along either the lines or the spaces, until colliding with the virtual drumpad at the corresponding key.

2. The method of claim 1, further comprising the step of morphing the game objects into classical musical notation.

3. A method of instructing a user to read musical notation through interaction with a graphical user interface and an input drumpad, comprising the steps of:
    a) generating the graphical user interface, having a first position, including a virtual drumpad positioned substantially at a top portion of the interface, having a plurality of pads, each pad having a corresponding pad on the input drumpad;
    b) incorporating a music file into the graphical user interface, wherein the music file contains data corresponding to an arrangement of a plurality of musical notes in sequence, having a rhythmic pattern, each note being represented by a game object;
    c) directing the game objects upward, in substantially straight trajectories, toward keys on the virtual drumpad corresponding to the musical notes;
    d) colliding the game objects with the corresponding keys according to the rhythmic pattern of the arrangement;
    e) awarding a value to the user based upon the user striking the corresponding key on the input drumpad approximately simultaneously with the collisions; and
    f) rotating the interface to a second position, approximately ninety (90) degrees counterclockwise, once a predetermined threshold of user performance has been met, such that the virtual drumpad is positioned substantially on a left side of the interface, and the game objects continue to move along the substantially straight trajectories toward the virtual drumpad.

4. The method of claim 3, further comprising the step of introducing a series of visible staff lines defining spaces, where the lines and spaces correspond to the straight trajectories along which the game objects travel toward the virtual drumpad, such that the game objects travel along either the lines or the spaces, until colliding with the virtual drumpad at the corresponding key.

* * * * *